United States Patent
Pang et al.

(10) Patent No.: US 12,333,736 B2
(45) Date of Patent: Jun. 17, 2025

(54) MULTIPLE TARGET TRACKING METHOD AND APPARATUS, CALCULATING DEVICE AND STORAGE MEDIUM

(71) Applicant: Beijing Tusen Zhitu Technology Co., Ltd., Beijing (CN)

(72) Inventors: Ziqi Pang, Beijing (CN); Zhichao Li, Beijing (CN); Naiyan Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 341 days.

(21) Appl. No.: 17/816,239

(22) Filed: Jul. 29, 2022

(65) Prior Publication Data

US 2023/0030496 A1 Feb. 2, 2023

(30) Foreign Application Priority Data

Jul. 29, 2021 (CN) .......................... 202110865211.1

(51) Int. Cl.
*G06T 7/20* (2017.01)
*G06T 7/70* (2017.01)
(Continued)

(52) U.S. Cl.
CPC .............. *G06T 7/20* (2013.01); *G06T 7/70* (2017.01); *G06V 10/25* (2022.01); *G06V 10/761* (2022.01);
(Continued)

(58) Field of Classification Search
None
See application file for complete search history.

(56) References Cited

U.S. PATENT DOCUMENTS 10,936,902 B1 3/2021 Bagwell et al.
2019/0266420 A1* 8/2019 Ge ......................... G06T 7/248

FOREIGN PATENT DOCUMENTS

CN 110738690 A 1/2020
CN 111771371 A 10/2020
(Continued)

OTHER PUBLICATIONS

L. Bommes, X. Lin and J. Zhou, "MVmed: Fast Multi-Object Tracking in the Compressed Domain," 2020 15th IEEE Conference on Industrial Electronics and Applications (ICIEA), Kristiansand, Norway, 2020, pp. 1419-1424, doi: 10.1109/ICIEA48937.2020.9248145. (Year: 2020).*

(Continued)

*Primary Examiner* — Beniyam Menberu
(74) *Attorney, Agent, or Firm* — Perkins Coie LLP

(57) ABSTRACT

The present disclosure provides a multiple target tracking method and apparatus, a calculating device and a storage medium, so as to solve the problem of inaccurate multiple target tracking in the prior art. The target tracking method comprises: obtaining a prediction box of a target in a current frame according to tracklets of one or more targets in historical frames; performing target detection on the current frame to obtain one or more detection boxes, wherein the detection boxes comprise a high-quality box and a medium-quality box; matching each prediction box with the detection box according to the similarity of the prediction box and the detection box; and in response to a prediction box being unmatched with the high-quality box but matched with the medium-quality box, determining that the target is in a tracking state in the current frame.

16 Claims, 5 Drawing Sheets

(51) Int. Cl.
*G06V 10/25* (2022.01)
*G06V 10/74* (2022.01)
*G06V 20/40* (2022.01)

(52) U.S. Cl.
CPC .... *G06V 20/46* (2022.01); *G06T 2207/20081* (2013.01); *G06V 2201/07* (2022.01)

(56) References Cited

FOREIGN PATENT DOCUMENTS

| | | | | |
|---|---|---|---|---|
| CN | 112862864 A | | 5/2021 | |
| CN | 112967316 A | | 6/2021 | |
| WO | WO 2021070228 | * | 4/2021 | ............... G06T 7/00 |

OTHER PUBLICATIONS

Zhang, Zheng, Dazhi Cheng, Xizhou Zhu, Stephen Lin, and Jifeng Dai. "Integrated object detection and tracking with tracklet-conditioned detection." arXiv preprint arXiv:1811.11167 (2018). (Year: 2018).*

M. Al-Shatnawi, V. Movahedi, A. Asif and A. An, "Improving Real-Time Pedestrian Detection Using Adaptive Confidence Thresholding and Inter-Frame Correlation," 2018 IEEE 20th International Workshop on Multimedia Signal Processing (MMSP), Vancouver, BC, Canada, 2018, pp. 1-5, doi: 10.1109/MMSP.2018.85471 (Year: 2018).*

Wang et al "Immortal Tracker: Tracklet Never Dies", Nov. 26, 2021, arXiv:2111.13672 [cs.CV], pp. 1-8 (Year: 2021).*

Nuri Benbarka et al. "Score refinement for confidence-based 3D multi-object tracking," arxiv.org Cornell University Library, 201 Olin Library Cornell University Ithaca, NY 14853, Jul. 9, 2021, pp. 1-8.

Lars, Eckert. Extended European Search Report Application No. 22186617.1-1210, mailed Dec. 16, 2022, pp. 1-10.

United Arab Emirates, Ministry of Economy, Substantive Examination Result & Search Report for UAE Appl. No. P6001393/2022, mailed on Jan. 29, 2025, 9 pages.

Mufleh Al-Shatnawi et al., "Improving Real-Time Pedestrian Detection Using Adaptive Confidence Thresholding and Inter-Frame Correlation," 2018 IEEE 20th International Workshop on Multimedia Signal Processing (MMSP), 7 pages.

* cited by examiner

```
[[1,0,0,0,0,0,0,time_lag,0,0]
 [0,1,0,0,0,0,0,0,time_lag,0]
 [0,0,1,0,0,0,0,0,0,time_lag]
 [0,0,0,1,0,0,0,0,0,0],
 [0,0,0,0,1,0,0,0,0,0],
 [0,0,0,0,0,1,0,0,0,0],
 [0,0,0,0,0,0,1,0,0,0],
 [0,0,0,0,0,0,0,1,0,0],
 [0,0,0,0,0,0,0,0,1,0],
 [0,0,0,0,0,0,0,0,0,1]])
```

*FIG. 5C*

MULTIPLE TARGET TRACKING METHOD AND APPARATUS, CALCULATING DEVICE AND STORAGE MEDIUM

CROSS-REFERENCE TO RELATED APPLICATION(S)

The present disclosure claims priority to Chinese Patent Application No. 202110865211.1, titled "MULTIPLE TARGET TRACKING METHOD AND APPARATUS, CALCULATING DEVICE AND STORAGE MEDIUM," filed on Jul. 29, 2021, the content of which is incorporated herein by reference in its entirety.

TECHNICAL FIELD

The present disclosure relates to the field of computer vision, and in particular, to a multiple target tracking method and apparatus, a calculating device and a storage medium.

BACKGROUND

The main task of multiple object tracking or multiple target tracking (MOT or MTT) is to position and label all targets in the observation frame sequence and perform one-to-one correspondence on targets among different observation frames, so that the same target still maintains the same label, thereby forming the motion tracks of different targets. However, the current multiple target tracking methods are prone to target tracking errors and track tracking errors. Therefore, it is necessary to improve the accuracy of multiple target tracking.

SUMMARY

Embodiments of the present disclosure provide a multiple target tracking method and apparatus, a calculating device and a storage medium, so as to improve the accuracy of multiple target tracking.

To achieve the above objectives, the embodiments of the present disclosure adopt the following technical solutions:

according to a first aspect of the embodiments of the present disclosure, a multiple target tracking method is provided. The multiple target tracking method comprises:

obtaining a prediction box of a target in a current observation frame according to a tracklet of the target in historical observation frames;

performing target detection on the current observation frame to obtain one or more detection boxes, wherein the detection boxes comprise at least one of: a high-quality box, a medium-quality box and a low-quality box;

matching the prediction box with the detection boxes according to the similarity of the prediction box and the detection box; and if the prediction box is unmatched with the high-quality box but matched with the medium-quality box, determining that the target is in a tracking state in the current observation frame.

According to a second aspect of the embodiments of the present disclosure, a multiple target tracking apparatus is provided. The multiple target tracking apparatus comprises:

a prediction module, configured for obtaining a prediction box of a target in a current observation frame according to a tracklet of the target in historical observation frames;

a detection module, configured for performing target detection on the current observation frame to obtain one or more detection boxes, wherein the detection boxes comprise at least one of a high-quality box, a medium-quality box and a low-quality box;

a matching module, configured for matching the prediction box with the detection boxes according to the similarity of the prediction box and the detection boxes; and an analysis module, configured for determining that the target is in a tracking state in the current observation frame when the prediction box is unmatched with the high-quality box but matched with the medium-quality box.

According to a third aspect of the embodiments of the present disclosure, a calculating device is provided. The calculating device comprises: a processor, a memory, and a computer program stored in the memory and capable of running on the processor, wherein when executing the computer program, the processor performs the aforementioned multiple target tracking method.

According to a fourth aspect of the embodiments of the present disclosure, a computer readable storage medium is provided. The computer readable storage medium stores a computer program. When the computer program is executed by the processor, the aforementioned multiple target tracking method is implemented.

According to the technical solutions provided by the embodiments of the present disclosure, when the prediction box predicted according to the tracklet is matched with the medium-quality detection box obtained by the target detection method, the life cycle of the motion object will be maintained, thereby avoiding the false detection operation caused by the fact that the life cycle is maintained only according to high-quality detection box. In addition, according to the present disclosure, the motion state of the object is updated only according to the matched high-quality detection box, and the medium-quality detection box will not cause updating of the motion state, thereby ensuring the accuracy of the maintained tracklet. Moreover, according to the present disclosure, various new distance measurements of the prediction box and the detection box are provided, and the tracking performance is improved; and the speed item is maintained in the state parameters, and the speed item is multiplied by a time difference between two frames to represent the displacement between two frames, thereby avoiding motion state maintenance error caused by the fact that a sensor loses a frame or a perception algorithm does not perceive the object.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description are merely some embodiments of the present disclosure, and a person of ordinary skill in the art may still derive other drawings from these accompanying drawings without creative efforts.

FIG. 5A to FIG. 5C are a conversion relationship matrix in embodiments of the present disclosure respectively;

DETAILED DESCRIPTION

Figure 1:
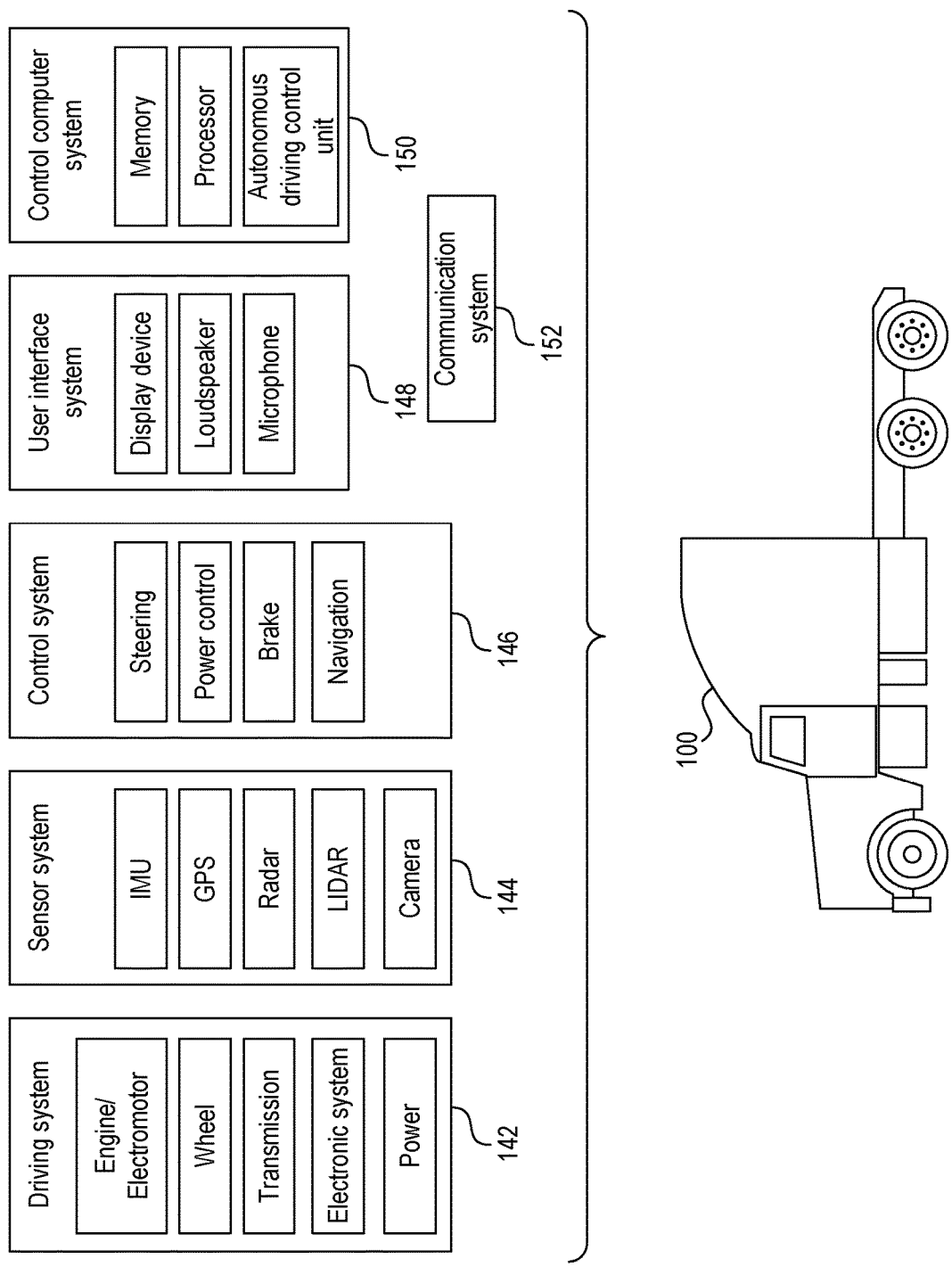
FIG. 1 is a structural diagram of a vehicle 100 according to an embodiment of the present disclosure.

The technical solutions in the embodiments of the present disclosure are described clearly and completely with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without any creative efforts shall fall within the protection scope of the present disclosure.

It should be noted that the terms "first," "second," and so on in the description and claims of the present disclosure and in the above accompanying drawings are intended to distinguish between similar objects but do not necessarily indicate a specific order or sequence. It should be understood that such used data is exchangeable in a proper case, so that the embodiments of the present disclosure are explicitly described herein. Moreover, the terms "including," "having," and any other variants mean to cover the non-exclusive inclusion, for example, a process, method, system, product, or device that comprises a series of steps or units is not necessarily limited to those steps or units which are clearly listed, but may comprise other steps or units which are not expressly listed or are inherent to such a process, method, system, product, or device.

In order to make those skilled in the art understand the present disclosure better, part of technical terms in the embodiments of the present disclosure are described as follows:

Point cloud: data of the surrounding environment acquired by a point cloud acquisition device (such as a LiDAR and a millimeter-wave radar) and marked by a group of sparse three-dimensional spatial points.

Frame: measuring data received when a sensor completes one observation, for example, one frame of data of a camera is a picture, and one frame of data of the point cloud acquisition device is a group of point cloud. The observation frame can be called frame for short.

Target: a target object in each frame of data, including a static object and a dynamic object, such as pedestrians, vehicles, animals, obstacles, signal lights and road signs.

Target detection: finding the position of a target object in sensor data through an algorithm. The position occupied by the object in the 2D or 3D space is generally represented by a rectangle or a cuboid.

Target tracking: for sensor input data and a give target object in a period of time, calculating the state parameters of the given target object at each moment.

Tracklet: historical information and a track of a certain target in a historical observation frame, including the state parameters of the target in the historical observation frame.

State parameters: position information of an object in a three-dimensional world, including a position parameter and/or an angle parameter, that is, a position and/or a pose in position and pose. The state parameters may further comprise information of a detection box, for example, position information and dimension information such as length, width and height of the detection box.

FIG. 1 is a schematic diagram of a vehicle 100 capable of realizing various technologies disclosed herein. The vehicle 100 may be a car, a truck, a motorcycle, a bus, a ship, an airplane, a helicopter, a lawn mower, an earth mover, a snowmobile, an aircraft, a recreational vehicle, an amusement park vehicle, a farm device, a building device, a tramcar, a golf cart, a train, a trolleybus or other vehicles. The vehicle 100 may fully or partially operate in an autonomous driving mode. The vehicle 100 may control itself in the autonomous driving mode. For example, the vehicle 100 may determine the current state of the vehicle and the current state of the environment in which the vehicle is, determine a prediction behavior of at least one of other vehicles in the environment, determine the trust level corresponding to the possibility of the at least one of other vehicles performing the prediction behavior, and control the vehicle 100 itself based on the determined information. In the autonomous driving mode, the vehicle 100 may operate without human interaction.

The vehicle 100 may comprise various vehicle systems, such as a driving system 142, a sensor system 144, a control system 146, a user interface system 148, a control computer system 150 and a communication system 152. The vehicle 100 may comprise more or less systems, and each system may comprise a plurality of units. Further, each system and each unit of the vehicle 100 may be interconnected. For example, the control computer system 150 can perform data communication with one or more of the vehicle systems 142-148 and 152. Therefore, one or more described functions of the vehicle 100 may be divided into additional functional parts or physical parts, or may be combined into a small number of functional parts or physical parts. In a further example, the additional functional parts or physical parts may be added to the example shown in FIG. 1.

The driving system 142 may comprise a plurality of operable parts (or units) for providing kinetic energy for the vehicle 100. In one example, the driving system 142 may comprise an engine or an electromotor, a wheel, a transmission, an electronic system and power (or a power source). The engine or electromotor may be any combination of the following devices: an internal combustion engine, a motor, a steam engine, a fuel cell engine, a propane engine or other forms of engines or electromotors. In some embodiments, the engine may convert a power source into mechanical energy. In some embodiments, the driving system 142 may comprise various engines or electromotors. For example, a gas-electric hybrid vehicle may comprise a gasoline engine and an electromotor, or may comprise other cases.

A wheel of the vehicle 100 may be a standard wheel. The wheel of the vehicle 100 may be wheels of various forms, including a single-wheel, double-wheel, three-wheel or four-wheel form, such as four wheels on the car or truck. Other numbers of wheels can also be possible provided, such as six wheels or more wheels. One or more wheels of the vehicle 100 may be operated in a different rotation direction from other wheels. The wheel may be at least one wheel fixedly connected to the transmission. The wheel may comprise a combination of metal and rubber, or a combination of other substances. The transmission may comprise a unit which can be operated to transmit mechanical power of the engine to the wheel. For this purpose, the transmission may comprise a gearbox, a clutch, a differential gear and a transmission shaft. The transmission may further comprise other units. The transmission shaft may comprise one or more wheel axles matched with the wheels. The electronic system may comprise a unit for transmitting or controlling electronic signals of the vehicle 100. The electronic signals may be used to start a plurality of lights, a plurality of servo mechanisms, a plurality of electromotors and other electronically driven or controlled devices of the vehicle 100. The power source may be energy which all or partially provides power for the engine or the electromotor. That is, the engine or the electromotor can convert the power source into mechanical energy. Exemplarily, the power source may comprise gasoline, petroleum, petroleum fuel, propane, other compressed gas fuel, ethanol, a fuel cell, a solar panel, a battery and other electric energy. The power source may additionally or optionally comprise any combination of a fuel tank, a battery, a capacitor or a flywheel. The power source may also provide energy for other systems of the vehicle 100.

The sensor system 144 may comprise a plurality of sensors, and the sensors are configured to sense information of the environment and condition of the vehicle 100. For example, the sensor system 144 may comprise an inertial measurement unit (IMU), a global positioning system (GPS) transceiver, a radar (RADAR) unit, a laser range finder/LIDAR unit (other distance measuring devices), an acoustic sensor and a camera or an image capture device. The sensor system 144 may comprise a plurality of inductors (for example, an oxygen (02) monitor, a fuel gauge sensor, an engine oil pressure sensor and the like) for monitoring the vehicle 100. Other sensors may also be configured. One or more sensors comprised in the sensor system 144 can be driven separately or collectively, so that the position, the direction or the position and the direction of one or more sensors can be updated.

IMU may comprise combination of sensors (such as an accelerator and a gyroscope), for sensing the position change and the direction change of the vehicle 100 based on inertial acceleration. The GPS transceiver may be any sensor for estimating the geographic position of the vehicle 100. For this purpose, the GPS transceiver may comprise a receiver/transmitter to provide position information of the vehicle 100 relative to the earth. It should be noted that GPS is one example of a global navigation satellite system; therefore, in some embodiments, the GPS transceiver may be replaced with a BeiDou navigation system transceiver or a Galileo satellite navigation system transceiver. The radar unit may use a radio signal to sense objects in the environment in which the vehicle 100 is. In some embodiments, in addition to sensing the objects, the radar unit may also be configured to sense the speed and the forward motion direction of an object approaching the vehicle 100. The laser range finder or LIDAR unit (or other distance measuring devices) may be any sensor for using laser to sense the object in the environment in which the vehicle 100 is. In one embodiment, the laser range finder/LIDAR unit may comprise a laser source, a laser scanner and a detector. The laser range finder/LIDAR unit is configured to work in a continuous (for example, using heterodyne detection) or discontinuous detection mode. The camera may comprise a device for capturing a plurality of images in the environment in which the vehicle 100 is. The camera may be a static image camera or a dynamic video camera.

The control system 146 is configured to control operation on the vehicle 100 or parts (or units) thereof. Correspondingly, the control system 146 may comprise various units, such as a steering unit, a power control unit, a brake unit and a navigation unit.

The steering unit may be a combination of machines for adjusting the forward motion direction of the vehicle 100. The power control unit (for example, it may be an accelerator), for example, may be configured to control the operating speed of the engine so as to control the speed of the vehicle 100. The brake unit may comprise a combination of machines for decelerating the vehicle 100. The brake unit may decelerate the vehicle by a friction force in a standard way. In other embodiments, the brake unit may convert the kinetic energy of the wheel into current. The brake unit may also adopt other forms. The navigation unit may be any system for determining a driving path or route for the vehicle 100. The navigation unit may also dynamically update the driving path in the driving process of the vehicle 100. The control system 146 may further additionally or optionally comprise other parts (or units) not shown or described.

The user interface system 148 may be configured to allow the vehicle 100 to interact with an external sensor, other vehicles, other computer systems and/or a user of the vehicle 100. For example, the user interface system 148 may comprise a standard vision display device (for example, a plasma display, a liquid crystal display (LCD), a touch display, a head-mounted display or other similar displays), a loudspeaker or other audio output devices, and a microphone or other audio input devices. For example, the user interface system 148 may further comprise a navigation interface, and an interface for controlling the internal environment (such as temperature and a fan) of the vehicle 100.

The communication system 152 may provide a way for communicating with one or more devices or other vehicles around for the vehicle 100. In one exemplary embodiment, the communication system 152 may communicate with one or more devices directly or through a communication network. The communication system 152, for example, may be a wireless communication system. For example, the communication system may use 3G cellular communication (for example, CDMA, EVDO and GSM/GRP) or 4G cellular communication (for example, WiMAX or LTE), or may use 5G cellular communication. Optionally, the communication system may communicate with a wireless local area network (WLAN) (for example, using WIFI®). In some embodiments, the communication system 152 may directly communicate with one or more devices or other vehicles around, for example, using infrared rays, Bluetooth® or ZIGBEE. Other wireless protocols, for example, various vehicle-mounted communication systems, are also within the scope disclosed by the present application. For example, the communication system may comprise one or more dedicated short range communication (DSRC) devices, V2V devices or V2X devices. These devices can perform public or private data communication with vehicles and/or roadside stations.

The control computer system 150 can control part of all of functions of the vehicle 100. An autonomous driving control unit in the control computer system 150 may be configured to identify, evaluate and avoid or negotiate potential obstacles in the environment in which the vehicle 100 is. Generally, the autonomous driving control unit may be configured to control the vehicle 100 without a driver, or provide assistance for the driver to control the vehicle. In some embodiments, the autonomous driving control unit is configured to combine data from the GPS transceiver, radar data, LIDAR data and camera data, and data from other vehicles, so as to determine the driving path or track of the vehicle 100. The autonomous driving control unit may be activated, so that the vehicle 100 can be driven in an autonomous driving mode.

The control computer system 150 may comprise at least one processor (which may comprise at least one microprocessor). The processor executes a processing instruction (that is, a machine executable instruction) stored in a non-volatile computer readable medium (for example, a data storage or memory). The memory stores at least one machine executable instruction. The processor executes at least one machine executable instruction to achieve the functions including a map engine, a positioning module, a perceiving module, a navigation or path module, an automatic control module and the like. The map engine and the positioning module are configured to provide map information and positioning information. The perceiving module is configured to perceive objects in the environment in which the vehicle is according to information acquired by the sensor system and map information provided by the map engine. The navigation or path module is configured to plan a driving path for vehicles according to the processing results of the map engine, the positioning module and the perceiving module. The automatic control module inputs, analyzes and converts decision-making information of the navigation or path module and other modules into a control command of the vehicle control system for output, and transmits the control command to the corresponding part in the vehicle control system through an in-vehicle network (for example, a vehicle internal electronic network system realized through CAN bus, local area network and multimedia directional system transmission) so as to automatically control the vehicle; and the automatic control module may also acquire information of various parts in the vehicle through the in-vehicle network.

The control computer system 150 may also be a plurality of calculating devices. These calculating devices distributively control the part or system of the vehicle 100. In some embodiments, the memory may comprise processing instructions (for example, program logic) which are executed by a processor to realize various functions of the vehicle 100. In one embodiment, the control computer system 150 can perform data communication with the systems 142, 144, 146, 148 and/or 152. An interface in the control computer system is configured to promote data communication between the control computer system 150 and the systems 142, 144, 146, 148 and 152.

The memory may further comprise other instructions, including an instruction for data transmission, an instruction for data reception, an instruction for interaction, or an instruction for controlling the driving system 140, the sensor system 144, or the control system 146 or the user interface system 148.

In addition to storing the processing instructions, the memory may store various kinds of information or data, for example, an image processing parameter, a road map and path information. In the operation period of the vehicle 100 in an automatic mode, a semi-automatic mode and/or a manual mode, the information may be used by the vehicle 100 and the control computer system 150.

Although the autonomous driving control unit is shown as being separated from the processor and the memory, it should be understood that in some implementation modes, some or part of functions of the autonomous driving control unit may be realized by a program code instruction resided in one or more memories (or data storage) and are performed by one or more processors; furthermore, the autonomous driving control unit may be realized by the same processor and/or memory (or data storage) in some cases. In some implementation modes, the autonomous driving control unit may at least partially use various dedicated circuit logics, various processors, various field-programmable gate arrays (FPGA), various application-specific integrated circuits (ASIC), various real-time controllers and hardware.

The control computer system 150 may control the functions of the vehicle 100 according to an input received from various vehicle systems (for example, the driving system 142, the sensor system 144 and the control system 146), or an input received from the user interface system 148. For example, the control computer system 150 may control a steering unit by using an input from the control system 146 to negotiate an obstacle detected by the sensor system 144. In one embodiment, the control computer system 150 may be used to control various aspects of the vehicle 100 and the system thereof.

Although FIG. 1 shows various parts (or units) integrated into the vehicle 100, one or more of the parts (or units) may be mounted on the vehicle 100 or may be separately associated with the vehicle 100. For example, the control computer system may be present partially or all independently of the vehicle 100. Therefore, the vehicle 100 can be present in the form of separate or integrated device units. Mutual communication between the device units forming the vehicle 100 may be realized through wired communication or wireless communication. In some embodiments, the additional part or unit may be added into each system, or one or more parts or units (for example, LiDAR or radar shown in FIG. 1) may be removed from the system.

Figure 2:
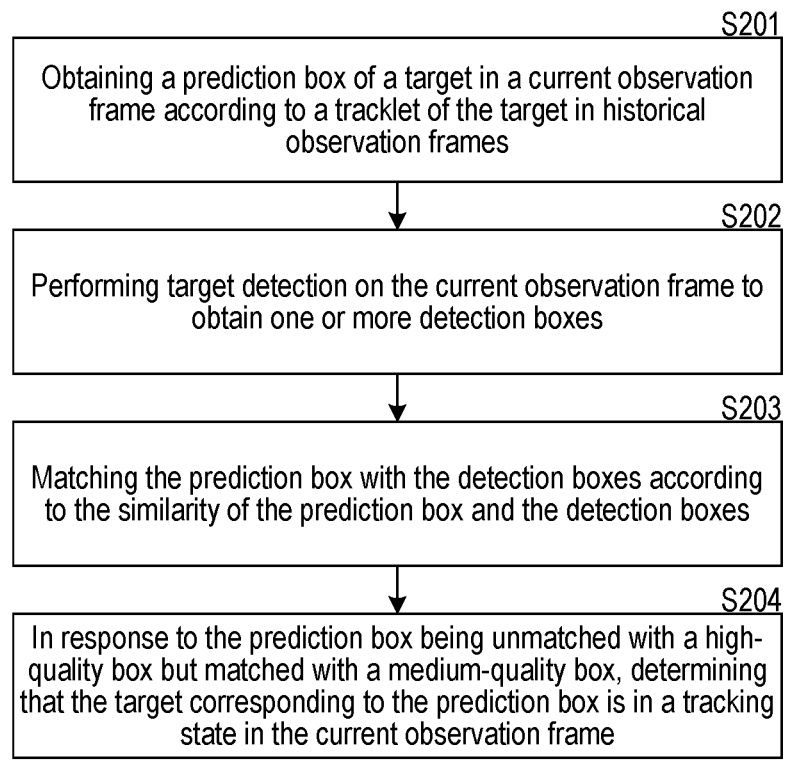
FIG. 2 is a flowchart of a multiple target tracking method 200 according to an embodiment of the present disclosure.

FIG. 2 shows a flowchart of a multiple target tracking method 200 according to an embodiment of the present disclosure. The method can be applied to an online scenario, or may be applied to an offline scenario. As shown in FIG. 2, the method comprises:

Step S201: a prediction box of a target in a current observation frame is obtained according to a tracklet of the target in historical observation frames. For example, for a sequence of consecutive frames, if the current frame is frame i, then the historical observation frames comprises frames 1, 2, . . . , i−1.

In some embodiments, the observation frame may be an image frame of an image sequence, or may be a point cloud frame in a point cloud sequence. The tracklet comprises state parameters and a detection box of each target in historical observation frame. According to the state parameters and a motion model of the target in the historical observation frame, the state parameters and the prediction box of the target in the current observation frame can be obtained. The motion model may comprise a Kalman filter and the like, and may comprise a prior value or a predicted value of the target between two adjacent frames. The latest state of the target can be obtained based on the Kalman filter.

Figure 3:
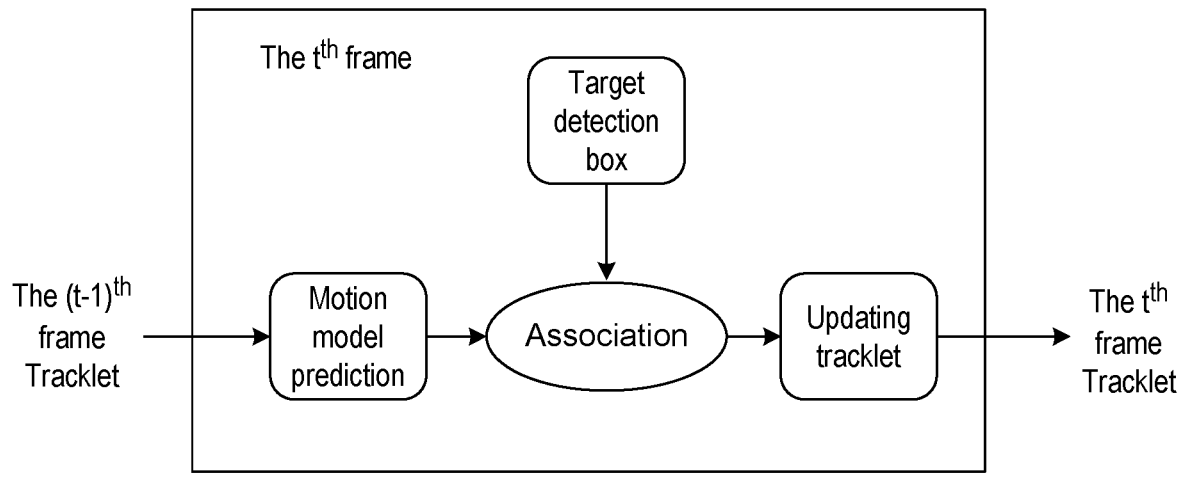
FIG. 3 is a schematic diagram of a multiple target tracking mode according to an embodiment of the present disclosure.

In some embodiments, according to the present disclosure, the currently latest tracklet will determined once after each frame is subjected to target detection, and the updating mode of the tracklet may be understood with reference to FIG. 3. In some embodiments, in response to a new target being detected, a tracklet is initialized for the new target; and in response to a certain target being disappeared in the past continuous multiple frames, the tracklet corresponding to the target will be cleared from a tracklet pool. Therefore, the historical observation frame may be the previous observation frame, that is, according to the present disclosure, the prediction box of the target in the current observation frame is determined based on the tracklet of the target in the previous observation frame. It should be understood that one of the important tasks of multiple target tracking is to associate two adjacent frames, that is, for the target detection box of the current frame and the tracklet of the previous frame, each target detection box corresponds to the tracklet. When the initial frame is subjected to target detection, a tracklet will be initialized for each detected target.

Step S202: the current observation frame is subjected to target detection to obtain one or more detection boxes, wherein the detection boxes comprise at least one of: a high-quality box, a medium-quality box or a low-quality box.

It should be understood that those skilled in the art may choose the target detection algorithm for target detection according to requirements, such as single-stage target detection and two-stage target detection, which is not limited in the present disclosure. The target detection algorithm outputs one or more detection boxes and an evaluation index (such as a score value) of each detection box, and each detection box may correspond to one target. Herein, the evaluation index of the detection box represents the quality of the detection box. Those skilled in the art may choose the term of evaluation index according to requirements, such as confidence, accuracy and intersection over union with a ground truth box, which is not limited in the present disclosure.

Based on the evaluation index of the detection box, the detection box output by each frame may be divided into a high-quality box, a medium-quality box and a low-quality box, wherein the high-quality box comprise a detection box with a score value greater than or equal to a first threshold; the medium-quality box comprise a detection box with a score value between the first threshold and a second threshold; and the low-quality box comprise a detection box with a score value less than the second threshold, and the second threshold is greater than 0. Specifically, the medium-quality box comprise a detection box with a score value less than the first threshold and greater than the second threshold. For different score types such as confidence and accuracy, those skilled in the art may set corresponding score thresholds, and the present disclosure does not limit the specific value of each score threshold. For example, the value interval of the first threshold is [0.5,0.7], specifically may be 0.5; and the value interval of the second threshold is [0.1,0.3], specifically may be 0.3, which is certainly not limited to this.

In some embodiment, the prediction box and the detection box may be two-dimensional boxes (such as rectangular boxes) or three-dimensional boxes (such as cuboids boxes). The prediction boxes and the detection boxes may be represented by the coordinate values of at least one of: a key point or the box size. For example, the prediction boxes and the detection boxes may be represented as the coordinates of a center point and length and width values. Those skilled in the art may choose the representative quantity of the box, as long as the box can be uniquely represented. For example, the two boxes may be represented as coordinate values of at least one of: a diagonal vertex or size values such as length and width values, or may be represented as coordinate values of four vertexes. For another example, the prediction boxes and the detection boxes may be represented as coordinates of a center point and length, width and height values, or may be represented as coordinate values of at least one of: a body diagonal vertex or size values such as length, width and height values, and may also be represented as coordinate values of eight vertexes.

Step S203: each prediction box is matched with the detection boxes according to the similarity of the prediction box and the detection boxes. Step S203 further comprises: determining whether the prediction box matches with the high-quality box according to the similarity of the prediction box and the high-quality box; determining whether the prediction box matches with the medium-quality box according to the similarity of the prediction box and the medium-quality box.

In some embodiments, the similarity is a measure value of a relative position relationship between the prediction box and the detection box. All measure values capable of representing the relative position relationship between the prediction box and the detection box belong to the protection scope of the similarity of the present disclosure. For example, the similarity may be the similarity of distance measure values (such as a Euclidean distance and a Mahalanobis distance) of the two boxes, intersection over union of area (that is, the ratio of intersection area to union area), intersection over union of volume (that is, the ratio of intersection volume to union volume) and image features corresponding to the two boxes. In addition, the present disclosure further provides some more accurate similarity parameters, which will be described in detail later.

In some embodiments, according to the present disclosure, the high-quality box is matched first and then the medium-quality box is matched, so that the accuracy of matching and target detection is improved. Specifically, the step S203 comprises: a high-quality box is extracted from the current observation frame to be matched with each tracklet for the first time; and for the unmatched tracklet, a medium-quality box is extracted from the current observation frame to be matched with the unmatched tracklet again.

For example, assuming that there are tracklets of 10 targets in the current tracklet pool, for 5 high-quality detection boxes and 10 medium-quality detection boxes in the current observation frame, the 5 high-quality detection boxes are matched with the existing tracklets, and then the 10 medium-quality detection boxes are matched with the unmatched tracklets. It should be noted that those skilled in the art may choose the matching algorithm of the prediction box and the detection box according to requirements, for example, the matching algorithm may be a bipartite graph matching algorithm, which may be specifically a Hungary algorithm and is certainly not limited to this.

Step S204: in response to the prediction box being unmatched (i.e., not matched) with the high-quality box but matched with the medium-quality box, it is determined that the target corresponding to the prediction box is in a tracking state in the current observation frame.

In some embodiments, in response to the prediction box being unmatched with the high-quality box and the medium-quality box, it is determined that the target corresponding to the prediction box is in a lost state in the current observation frame; and if a certain target is in a lost state in the continuous multiple frames, it is determined that the target is in a disappearing state and the tracklet corresponding to the target is cleared.

In some embodiments, in response to the prediction box being matched with the medium-quality box, the state parameters of the tracklet corresponding to the prediction box is maintained unchanged; and in response to the prediction box being matched with the high-quality box, it is determined that the target corresponding to the prediction box is in a tracking state in the current observation frame, and the state parameters of the corresponding tracklet is updated according to the high-quality box.

It can be seen that the state of the target in the observation frame according to the present disclosure comprises a tracking state, a lost state and a disappearing state. The tracking state means that the target should be present in the current observation frame, the lost state means that the target is not present in the current observation frame, and the disappearing state means that the target has disappeared in the observation visual field (or in consecutive multiple frames). In addition, it is determined that the object is in a tracking state when the high-quality box and the medium-quality box are matched, but the presence accuracy determined by the high-quality box is higher; therefore, the life cycle of the target can be maintained by the high-quality box; meanwhile, the motion model (such as a Kalman filter) of the target is updated, that is, the latest state parameters of the target is updated as the state parameters in the current observation frame. The presence accuracy determined by the medium-quality box is relatively low; therefore, the medium-quality box only maintains the life cycle of the target, but the motion model of the target is not updated, that is, the latest state parameters of the target still maintains the state parameters in the previous tracklet.

Figure 4A:
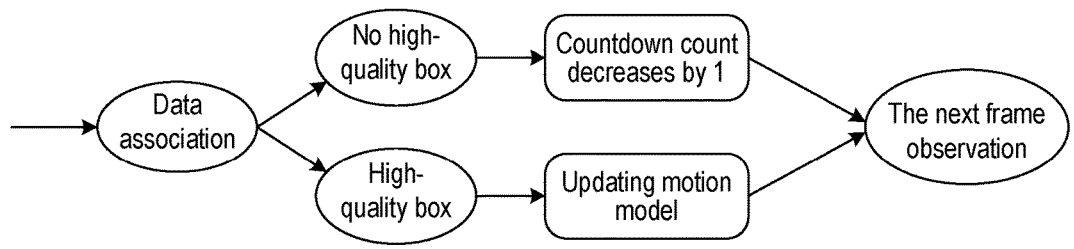
FIG. 4A and FIG. 4B are schematic diagrams of a multiple target tracking mode according to an embodiment of the present disclosure respectively.
Figure 4B:
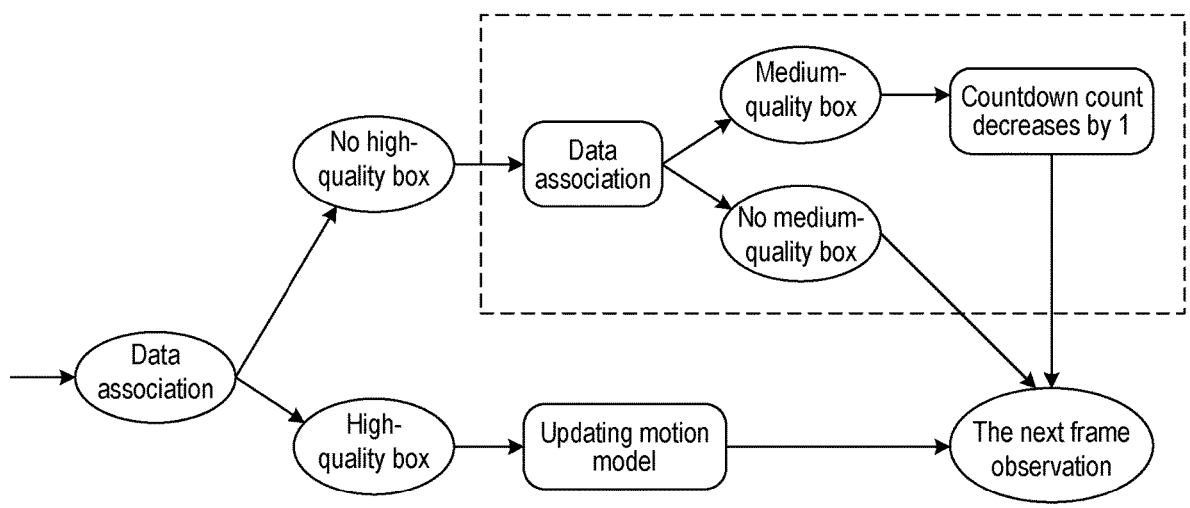

Herein, as shown in FIG. 4A, if the life cycle of the target is updated only according to the matched high-quality detection box, the corresponding tracklet will be cleared as long as the high-quality box is not matched (unmatched). This approach will result in that the tracklet is deleted by mistake in advance under the conditions that the target detection quality is low and the vehicle is sheltered. The target tracking method adopted in the present disclosure is shown in FIG. 4B. In addition to using a high threshold to screen the high-quality detection box, a medium threshold is also adopted to screen medium-quality detection boxes capable of representing "there is an object here." These medium-quality detection boxes may effectively maintain the life state of the tracklet, but is not used to update the motion model, thereby avoiding confusion caused by the actual state of the target.

In some embodiments, each tracklet has a corresponding target identifier. The method 200 may further comprise: for the matched high-quality box and medium-quality box in the current observation frame, an association relationship between the detection box and the corresponding tracklet is established, and the target identifier of the associated tracklet is output for the detection box. That is, one target corresponds to one tracklet. After the detection box and the prediction box are matched, the detection box can ensure that the same target has the same identifier in the same observation frame sequence, thereby avoiding that the same target has different identifiers.

In some embodiments, if a certain detection box is unmatched with any prediction box and the detection box is a high-quality box, a tracklet is newly generated for the high-quality box, and a target identifier is newly generated for the tracklet. One tracklet is initialized only for the high-quality detection box herein. However, if a certain medium-quality detection box is unmatched with any prediction box, a tracklet is not initialized for the medium-quality detection box, thereby ensuring the accuracy of the tracklet in the tracklet pool.

In some embodiments, when a certain target is determined to be in a lost state for the first time, that is, a certain tracklet is unmatched with the detection box for the first time, a countdown module is started for the target, and a countdown count is set initially as k (k is an integer greater than or equal to 2). If the target in the next frame is still determined to be in a lost state, that is, the tracklet is still unmatched with the detection box, the countdown count decreases by 1 (that is, the number of frames where the target does not appear increases by 1). By analogy, when the countdown count is changed to 0, that is, the target in the continuous k frames is in the lost state, it is determined that the target is in the disappearing state.

However, if a certain target is re-determined to be in a tracking state in the countdown process, that is, the detection box matched with the corresponding tracklet, the countdown count is reset as k, and counting is started again. That is, it is determined that the target disappears only when the target in the continuous k frames is in the lost state; and if the target in at least one of the k frames is in the tracking state, it is not determined that the target is in the disappearing state.

In some embodiments, according to the method 200, a to-be-output detection box may be determined according to the score of the detection box. Specifically, for each matched detection box, information of the matched detection box, and information of each detection box in the tracklet associated with the detection box are input into a preset learning model to obtain an output probability of the detection box. When the output probability of a certain detection box is greater than or equal to a preset threshold, the state parameters of the detection box is output. The information comprises at least one of: the state parameters of the detection box or the quality of the detection box, wherein the quality of the detection box, for example, is the score value of the detection box. The matched detection box refers to a matched detection box of which the quality meets a predetermined condition.

Herein, if only a matched high-score box is output, some medium-score boxes closer to a true value box may be ignored. Therefore, according to the present disclosure, an output evaluation strategy of a detection box is designed, and the score value of each detection box is corrected based on a learning model to determine which detection boxes need to be output. The input of the learning model is the information of the current detection box and the information of each detection box in the tracklet associated with the detection box, and the output comprises a probability of whether the current detection box needs to be output. Then, whether the detection box needs to be output can be determined according to the output probability.

Furthermore, the input of the learning model comprise the score value of the current detection box output by the target detection algorithm, and the score value of each detection box in the tracklet associated with the detection box; and the output comprise the score value after the current detection box is corrected. Then, whether the detection box needs to be output can be determined according to the corrected score value. Those skilled in the art may choose the type, parameters and hyperparameters of the learning model according to requirements, which is not limited in the present disclosure.

In some embodiments, the quality of the detection box meets a predetermined condition, for example, the detection box is a high-quality box or a medium-quality box, or the score value of the detection box is greater than or equal to a predetermined threshold. In an implementation mode, according to the present disclosure, only the matched detection box with the confidence greater than or equal to 0.5 is input into the learning model to determine whether to output the box, while the matched detection box with the confidence less than 0.5 will not be input into the learning model for judgment.

In addition, when the similarity of the prediction box and the detection box adopts the Mahalanobis distance and the Euclidean distance, a large number of matching errors may be caused due to the inability to determine the overlapping relationship of objects. When the intersection over union of area is adopted, it may fail in a vehicle which moves fast. Therefore, according to the present disclosure, the distance between the prediction box and the detection box is measured by a new distance measure generalized IOU (GIOU), thereby significantly improving the tracking performance.

In some embodiments, in response to the prediction box and the detection box are two-dimensional boxes, the similarity of the prediction box and the detection box is related to the intersection area of the two boxes, the union area of the two boxes and the area of an external convex polygon.

In some embodiments, in response to the prediction box and the detection box are three-dimensional boxes, the similarity of the prediction box and the detection box is related to the intersection volume of the two boxes, the union volume of the two boxes and the volume of an external convex polygon.

Further, the step of calculating the similarity of the three-dimensional boxes comprises:

1) a first projection box and a second projection box of the prediction box and the detection box on a two-dimensional plane are generated respectively:

assuming that the prediction box and the detection box are 3D BBox A and 3D BBox B respectively, the two-dimensional projection boxes of the two three-dimensional boxes under the perspective of a top view are obtained and recorded as 2D BBox A' and 2D BBox B' respectively.

2) The intersection area of the first projection box and the second projection box and the area of the external convex polygon are calculated:

the intersection region of the two-dimensional boxes A' and B' under the top view is I, and the area of the intersection region is $S_I$; and the external convex polygon of the two-dimensional boxes A' and B' under the top view is C, and the area of the external convex polygon is $S_C$;

3) the intersection height and the union height of the prediction box and the detection box on a vertical axis are calculated:

the intersection height of the three-dimensional boxes A and B on an axis z is:

$$H_I = \max(0, \min((z_A+h_A/2)-(z_B-h_B/2), (z_B+h_B/2)-(z_A-h_A/2))); \text{ and}$$

the union height of the three-dimensional boxes A and B on the axis z is:

$$H_C = \max((z_A+h_A/2)-(z_B-h_B/2), (z_B+h_B/2)-(z_A-h_A/2))$$

wherein $z_A$ and $z_B$ are the coordinate values of the key points of the three-dimensional boxes A and B on the axis z respectively, which specifically may be the coordinate values of a center point on the axis z; and $h_A$ and $h_B$ are the height values of the three-dimensional boxes A and B on the axis z respectively.

4) The intersection volume is calculated according to the intersection area and the intersection height of the first projection box and the second projection box:

the intersection volume of the three-dimensional boxes A and B is: $V_I = S_I * H_I$ 5) The volume of the external convex polygon is calculated according to the area of the external convex polygon and the intersection height:

the volume of the external convex polygon of the three-dimensional boxes A and B is: $V_C = S_C * H_C$ 6) The union volume is calculated according to the volume of the prediction box, the volume of the detection box and the intersection volume:

the union volume of the three-dimensional boxes A and B is: $V_U = w_A * h_A * l_A + w_B * h_B * l_B - V_I$ 7) GIOU of the prediction box and the detection box is calculated according to the intersection volume, the union volume and the volume of the external convex polygon:

$$GIOU(A,B) = V_I/V_U - (V_C - V_U)/V_C$$

In some embodiments, the similarity of the present disclosure may also adopt a distance-IOU (DIOU) based on the three-dimensional box. DIOU takes the distance and the overlapping ratio of the prediction box and the detection box into consideration. Specifically, DIOU is obtain according to the volume intersection over union of the prediction box and the detection box, the Euclidean distance $d_1$ between the center point coordinates of the prediction box and the detection box, and the diagonal distance $d_2$ between the external convex polygons of the prediction box and the detection box. The volume intersection over union of the prediction box and the detection box may be directly intersection volume divided by union volume, or may be a new GIOU calculated above. In an implementation mode, DIOU=volume intersection over union$-d_1/d_2$=GIOU$-d_1/d_2$.

In some embodiments, the similarity of the present disclosure may also adopt complete-IOU (CIOU) based on three-dimensional boxes. CIOU takes the overlapping ratio and the center point distance of the prediction box and the detection box, and the size ratio of the prediction box to the detection box into consideration, that is, the loss item of the length-width ratio is added on the basis of DIOU. Specifically, CIOU=DIOU+$\alpha v$, wherein a is α weight, and v is used to measure the similarity of the size ratio (such as the length-width ratio, the length-height ratio, the width-height ratio, or the mean value of the three ratios).

It can be seen that according to the present disclosure, various measure values of three-dimensional boxes are set to measure the similarity of the prediction box and the detection box. Compared with the Mahalanobis distance and the Euclidean distance, the generalization performance of multiple target tracking is improved, and the difficulty of readjusting the distance measure threshold for different associations under each new scenario is eliminated.

In addition, as mentioned above, the present disclosure may adopt the Kalman filter to maintain the motion state of the target. In the Kalman filter, x represents the motion state of the target, such as the position and speed of the target; z represents observation, such as the detection box corresponding to the target. In the Kalman filter, the motion state transfer of the object is described by the two formulas $x_t=F_t x_{t-1}+w_t$ and $z_t=H_t x_t+v_t$. $x_t=F_t x_{t-1}+w_t$ describes the state transfer of the target in the adjacent time points, wherein $w_t$ represents noise, and $F_t$ is the state transfer conversion relationship, may be a vector or may be a matrix, which is certainly not limited to this. $z_t=H_t x_t+v_t$ describes the relationship between the observation quantity $z_t$ and the state parameters $x_t$, wherein $H_t$ is the observation conversion relationship and may also be a vector or matrix, and $v_t$ represents noise.

Generally, the state parameters $x_t$ includes, but is not limited to a position parameter and an angle parameter of the target, and the size of the corresponding detection box. The position parameter comprises at least one of a first coordinate, a second coordinate and a third coordinate of key points of the target in a space coordinate system. The first coordinate, the second coordinate, and the third coordinate may correspond to the x-axis coordinate, the y-axis coordinate, and the z-axis coordinate in the space coordinate system. The angle parameter comprises at least one of a pitch, a yaw and a roll. There may be one or more key points. For example, the key point may be a center point of an object or a center point of the specific part of the object, or a set of these points. For example, the key point of a vehicle may be a center point of the vehicle, or may be a center point of a vehicle head, a center point of rear wheels on two sides, or a set of a plurality of vehicle body points. The number and positions of the key points are not limited in the present disclosure.

In some embodiments, the state parameters $x_t$ comprises [x, y, z, yaw, l, w, h, $\Delta$x, $\Delta$y, $\Delta$z] and represents the position and size of the object, and the displacement of two frames; and the observation quantity $z_t$ comprises [x, y, z, yaw, l, w, h] and represents the target detection box of each frame. Therefore, $H_t$ and $F_t$ are shown in FIG. 5A and FIG. 5B respectively. If the state parameters is an n-dimensional vector, $H_t$ is an n*(n–3)-dimensional matrix, and $F_t$ is an n*n-dimensional matrix. The values of diagonal lines of the first n–3 columns of the $H_t$ matrix are all 1, and other values are 0; and the values of the later 3 columns of the matrix are all 0. The values of the diagonal line of the $F_t$ matrix, and the values of the $(n-2)^{th}$ column in the first row, the $(n-1)^{th}$ column in the second row and the $n^{th}$ column in the third row are all 1, and other values are 0.

However, considering that if the position of each object and the displacement of the object between two frames are maintained only in the Kalman filter, when the sensor loses an intermediate frame or the perception algorithm fails to perceive the object in the continuous multiple frames, the Kalman filter will make mistakes in maintaining the motion state of the target. Therefore, the state parameters $x_t$ maintained by the present disclosure may be not the displacement of the target object between two frames, but may be the speed of the target, and at this time, the state parameters is changed into [x, y, z, yaw, l, w, h, $v_x$, $v_y$, $v_z$]. Therefore, $F_t$ is changed into the matrix shown in FIG. 5C, that is, the values of the $(n-2)^{th}$ column in the first row, the $(n-1)^{th}$ column in the second row and the $n^{th}$ column in the third row are all replaced with time_lag, and the time_lag represents the time difference between two observations.

Based on this, the method 200 may further comprise the following steps:

the state parameters of the target in the next observation frame is calculated according to the state parameters of the target in the current observation frame and a preset state transfer conversion relationship; and prediction box information of the target in the next observation frame is calculated according to the state parameters of the target in the next observation frame and a preset observation conversion relationship.

Further, the state parameters comprise a position and a speed, and the speed comprises speed components on three coordinate axes. The step of calculating the state parameters of the target in the next observation frame according to the state parameters of the target in the current observation frame and the preset state transfer conversion relationship comprises: the state parameters of the target in the next observation frame is calculated according to the state transfer conversion relationship, the position and speed of the target in the current observation frame, and the time difference of two adjacent frames.

It can be seen that according to the present disclosure, by maintaining the target position and the target speed, the displacement of the object between two observations is represented by multiplying timestamp by speed, and the latest position of the target is obtained, so that the robustness when the sensor loses a frame or the perception algorithm loses observation can be improved.

Figure 6:
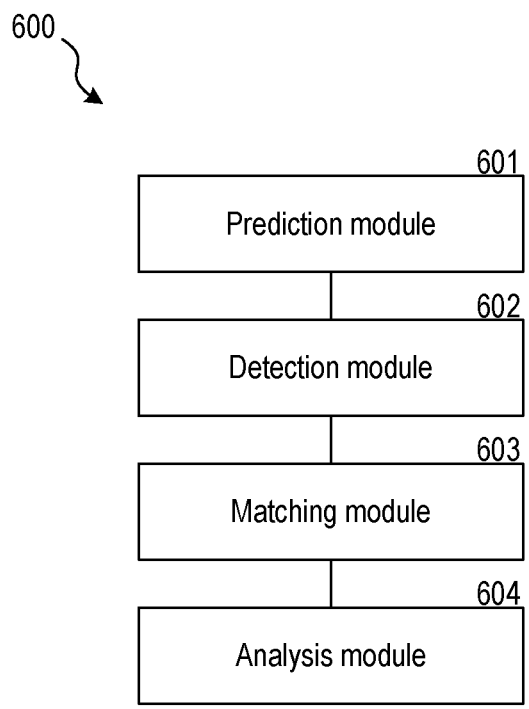
FIG. 6 is a structural diagram of a multiple target tracking apparatus 600 according to an embodiment of the present disclosure.

FIG. 6 shows a schematic diagram of a multiple target tracking apparatus 600 according to an embodiment of the present disclosure. As shown in FIG. 6, the apparatus 600 comprises:

a prediction module 601, configured for obtaining a prediction box of each target in a current observation frame according to tracklets of one or more targets in historical observation frames;

a detection module 602, configured for performing target detection on the current observation frame to obtain one or more detection boxes, wherein the detection boxes comprise at least one of: a high-quality box, a medium-quality box or a low-quality box;

a matching module 603, configured for matching each prediction box with the detection box according to the similarity of the prediction box and the detection box; and an analysis module 604, configured for determining that the target corresponding to the prediction box is in a tracking state in the current observation frame in response to a prediction box being unmatched with the high-quality box but matched with the medium-quality box.

In some embodiments, the matching module 603 is further configured for: extracting a high-quality box from the current observation frame to match with each tracklet for the first time; and for the unmatched tracklet, extracting a medium-quality box from the current observation frame to match with the unmatched tracklet again. The calculation process of the similarity has been disclosed in the description of the method 200 in detail, which is thus not elaborated herein.

In some embodiments, the analysis module 604 is further configured for:

in response to a certain prediction box being matched with the medium-quality box, maintaining the state parameters of the corresponding tracklet unchanged;

in response to a prediction box being matched with the high-quality box, determining that the target corresponding to the prediction box is in a tracking state in the current observation frame, and updating the state parameters of the corresponding tracklet according to the high-quality box;

in response to a detection box is unmatched with any prediction box and the detection box is a high-quality box, newly generating a tracklet for the high-score box, and newly generating a target identifier for the tracklet;

in response to a detection box is unmatched with the high-quality box and the medium-quality box, determining that the target corresponding to the prediction box is in a lost state in the current observation frame; and in response to a target being in a lost state in continuous multiple frames, determining that the target is in a disappearing state and deleting the corresponding tracklet from a tracklet pool.

In some embodiments, each tracklet has a corresponding target identifier. The apparatus 600 may further comprise: an output module, configured for: for the matched high-quality box and medium-quality box in the current observation frame, establishing an association relationship between the detection box and the corresponding tracklet, and outputting the target identifier of the associated tracklet for the detection box.

In some embodiments, the output module is further configured for: for each matched detection box, inputting information of the matched detection box, and information of each detection box in the tracklet associated with the detection box into a preset learning model to obtain an output probability of the detection box; and when the output probability of a certain detection box is greater than or equal to a preset threshold, outputting the state parameters of the detection box, wherein the information comprises the state parameters of the detection box and/or the quality of the detection box. The matched detection box refers to a matched detection box of which the quality meets a predetermined condition.

In some embodiments, the output module is further configured for: calculating the state parameters of the target in the next observation frame according to the state parameters of the target in the current observation frame and a preset state transfer conversion relationship; and calculating prediction box information of the target in the next observation frame according to the state parameters of the target in the next observation frame and a preset observation conversion relationship, wherein the state parameters comprises a position and a speed, then the output module is further configured for calculating the state parameters of the target in the next observation frame according to the state transfer conversion relationship, the position and speed of the target in the current observation frame, and the time difference of two adjacent frames.

According to the multiple target tracking apparatus 600 provided by the present disclosure, the specific details have been disclosed in detail in the description based on other drawings, which are thus not elaborated herein.

In addition, the embodiments of the present disclosure further provide a computer readable storage medium, including a program or instruction, wherein when the program or instruction runs in a computer, the aforementioned multiple target tracking method is implemented.

Figure 7:
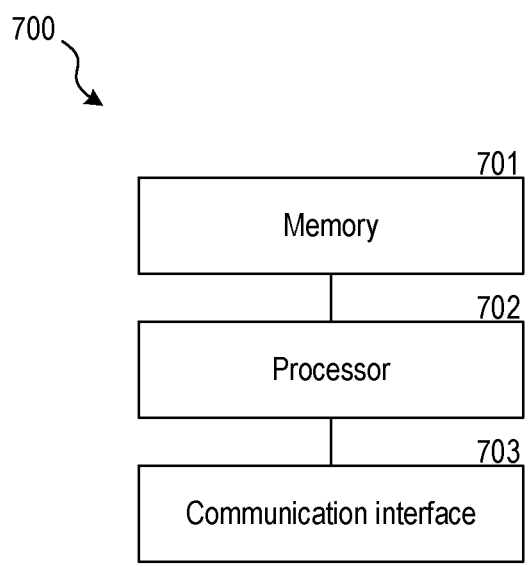
FIG. 7 is a structural diagram of a calculating device 700 according to an embodiment of the present disclosure.

In addition, the embodiments of the present disclosure further provide a calculating device 700 shown in FIG. 7, including a memory 701, and one or more processors 702 in communication connection with the memory. The memory 701 stores an instruction executable by one or more processors 702; and the instruction is executed by one or more processors 702, so that one or more processors 702 implement the aforementioned point cloud processing method. The calculating device 700 may further comprise a communication interface 703, and the communication interface 703 may implement one or more communication protocols (LTE, Wi-Fi and the like).

According to the technical solutions of the present disclosure, the prediction box of each target in the current frame is predicted according to the existing tracklet, the detection box of the current frame is obtained according to the target detection algorithm, and then the life cycle of the object is updated according to the matching result of the prediction box and the detection box. The matched medium-quality box only maintains the life cycle, but does not update the latest state parameters of the tracklet, and the matched high-quality box maintains the life cycle and updates the latest state parameters of the tracklet, thereby avoiding the condition that the tracklet is cleared in advance due to that the target detection is unstable or the vehicle is sheltered, and ensuring high accuracy of the motion model. Furthermore, for each observation frame, the position and serial number of each target object are calculated and output, so that the same object has the same serial number in the associated frames.

A person skilled in the art should understand that the embodiments of the present disclosure may be provided as methods, systems, or computer program products. Therefore, the present disclosure may use a form of hardware-only embodiments, software-only embodiments, or embodiments with a combination of software and hardware. Moreover, the present disclosure may use a form of a computer program product that is implemented on one or more computer-usable storage media (including but not limited to a magnetic disk memory, a CD-ROM, an optical memory, and the like) that comprise computer-usable program code.

The present disclosure is described with reference to the flowcharts and/or block diagrams of the methods, devices (systems), and computer program products according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer readable memory that can instruct the computer or any other programmable data processing device to work in a specific manner, so that the instructions stored in the computer readable memory generate an artifact that comprises an instruction apparatus. The instruction apparatus implements a specific function in one or more processes in the flowcharts and/or in one or more blocks in the block diagrams.

These computer program instructions may also be loaded onto a computer or another programmable data processing device, so that a series of operation steps are performed on the computer or other programmable devices to produce computer-implemented processing, and the instructions executed on the computer or other programmable devices provide steps for implementing the functions specified in one or more processes of the flowchart and/or one or more blocks of the block diagram.

In the present disclosure, the principle and the implementation modes of the present disclosure are described by the specific embodiments, and the description of the above embodiments is merely used to help understand the method of the present disclosure and the core concept thereof; meanwhile, for those of ordinary skill in the art, the specific implementation modes and application scope will be changed according to the concept of the present disclosure; and in conclusion, the contents of the specification should not be understood as a limitation to the present disclosure.

What is claimed is:

1. A multiple target tracking method, comprising:
obtaining a prediction box of a target in a current frame according to a tracklet of the target in historical frames;
performing target detection on the current frame to obtain one or more detection boxes, wherein the detection boxes comprise a high-score box and a medium-score box;
in response to the prediction box being unmatched with the high-score box but matched with the medium-score box, determining that the target is in a tracking state in the current frame;
in response to the prediction box being matched with the medium-score box, maintaining state parameters of the tracklet unchanged; and
in response to the prediction box being matched with the high-score box, determining that the target is in the tracking state in the current frame, and updating the state parameters of the tracklet according to the high-score box.

2. The method according to claim 1, wherein the tracklet has a target identifier, and the method further comprises:

for a matched high-score box and medium-score box which are matched by the prediction box in the current frame:
  establishing an association relationship between the detection box and tracklet; and
  outputting the target identifier of the tracklet for the detection box.

3. The method according to claim 2, further comprising:
for a matched detection box which is matched by the prediction box, inputting information of the matched detection box, and information of a detection box in the tracklet associated with the matched detection box into a preset learning model to obtain an output probability of whether the matched detection box needs to be output, wherein the information comprises at least one of: state parameters of the matched detection box and a score of the matched detection box.

4. The method according to claim 3, further comprising:
in response to the output probability of the matched detection box being greater than or equal to a preset threshold, outputting the state parameters of the matched detection box.

5. The method according to claim 1, further comprising at least one of:
in response to the prediction box being unmatched with the high-score box and the prediction box being unmatched with the medium-score box, determining that the target is in a lost state in the current frame; or
in response to the target being in the lost state in continuous multiple frames, determining that the target is in a disappearing state and deleting the tracklet from a tracklet pool.

6. The method according to claim 1, further comprises:
matching the prediction box with the detection boxes according to similarity of the prediction box and the detection boxes, which further comprises:
  extracting the high-score box in the current frame to match with the tracklet for a first time; and
  in response to the tracklet being unmatched with the high-score box, extracting the medium-score box from the current frame to match with the tracklet again.

7. The method according to claim 1, wherein the method further comprises:
calculating an intersection volume according to an intersection area and an intersection height of a first projection box and a second projection box;
calculating the volume of an external convex polygon according to the area of the external convex polygon and a union height; and
calculating the intersection volume according to the volume of the prediction box, the volume of the detection box and the intersection volume.

8. The method according to claim 1, further comprising:
calculating the state parameters of the target in a next frame according to the state parameters of the target in the current frame and a preset state transfer conversion relationship; and
calculating prediction box information of the target in the next frame according to the state parameters of the target in the next frame and a preset observation conversion relationship.

9. The method according to claim 8, wherein the state parameters comprise a position and a speed, and calculating the state parameters of the target in the next frame according to the state parameters of the target in the current frame and the preset state transfer conversion relationship comprises:
calculating the state parameters of the target in the next frame according to the state transfer conversion relationship, the position and speed of the target in the current frame, and a time difference of two adjacent frames.

10. The method according to claim 1, wherein the detection boxes further comprise a low-score box,
the high-score box is a detection box with a score value greater than or equal to a first threshold;
the medium-score box is a detection box with a score value between the first threshold and a second threshold;
the low-score box is a detection box with a score value less than the second threshold, and the second threshold is greater than 0; and
wherein the score is associated with at least one of confidence or accuracy.

11. A calculating device, comprising:
a processor, a memory, and a computer program stored in the memory and capable of running on the processor,
wherein when executing the computer program, the processor performs a multiple target tracking method comprising:
  obtaining a prediction box of a target in a current frame according to a tracklet of the target in historical frames;
  performing target detection on the current frame to obtain one or more detection boxes, wherein the detection boxes comprise a high-score box and a medium-score box;
  in response to the prediction box being unmatched with the high-score box but matched with the medium-score box, determining that the target is in a tracking state in the current frame;
  in response to the prediction box being matched with the medium-score box, maintaining state parameters of the tracklet unchanged; and
  in response to the prediction box being matched with the high-score box, determining that the target is in the tracking state in the current frame, and updating the state parameters of the tracklet according to the high-score box.

12. The calculating device according to claim 11, wherein the tracklet has a target identifier, and the method further comprises:
for a matched high-score box and medium-score box which are matched by the prediction box in the current frame:
  establishing an association relationship between the detection box and the tracklet; and
  outputting the target identifier of the tracklet for the detection box.

13. The calculating device according to claim 12, wherein the method further comprises:
for a matched detection box which is matched by the prediction box, inputting information of the matched detection box, and information of a detection box in the tracklet into a preset learning model to obtain an output probability of whether the matched detection box needs to be output, wherein the information comprises the at least one of: state parameters of the detection box and a score of the detection box.

14. A non-transitory computer readable storage medium, wherein the computer readable storage medium stores a computer program, and when the computer program is executed by a processor, a multiple target tracking method comprising:

obtaining a prediction box of a target in a current frame according to a tracklet of the target in historical frames;

performing target detection on the current frame to obtain one or more detection boxes, wherein the detection boxes comprise a high-score box and a medium-score box;

in response to the prediction box being unmatched with the high-score box but matched with the medium-score box, determining that the target is in a tracking state in the current frame;

in response to the prediction box being matched with the medium-score box, maintaining state parameters of the tracklet unchanged; and in response to the prediction box being matched with the high-score box, determining that the target is in the tracking state in the current frame, and updating the state parameters of the tracklet according to the high-score box.

15. The non-transitory computer readable storage medium according to claim 14, wherein the method further comprises:

in response to the prediction box being unmatched with the high-score box and the prediction box being unmatched with the medium-score box, determining that the target is in a lost state in the current frame; or in response to the target being in the lost state in continuous multiple frames, determining that the target is in a disappearing state and deleting the tracklet from a tracklet pool.

16. The non-transitory computer readable storage medium according to claim 14, wherein the method further comprises:

matching the prediction box with the detection boxes according to similarity of the prediction box and the detection boxes, which further comprises:

extracting the high-score box in the current frame to match with the tracklet for an first time; and in response to the tracklet being unmatched with the high-score box, extracting the medium-score box from the current frame to match with the tracklet again.

* * * * *